UNITED STATES PATENT OFFICE.

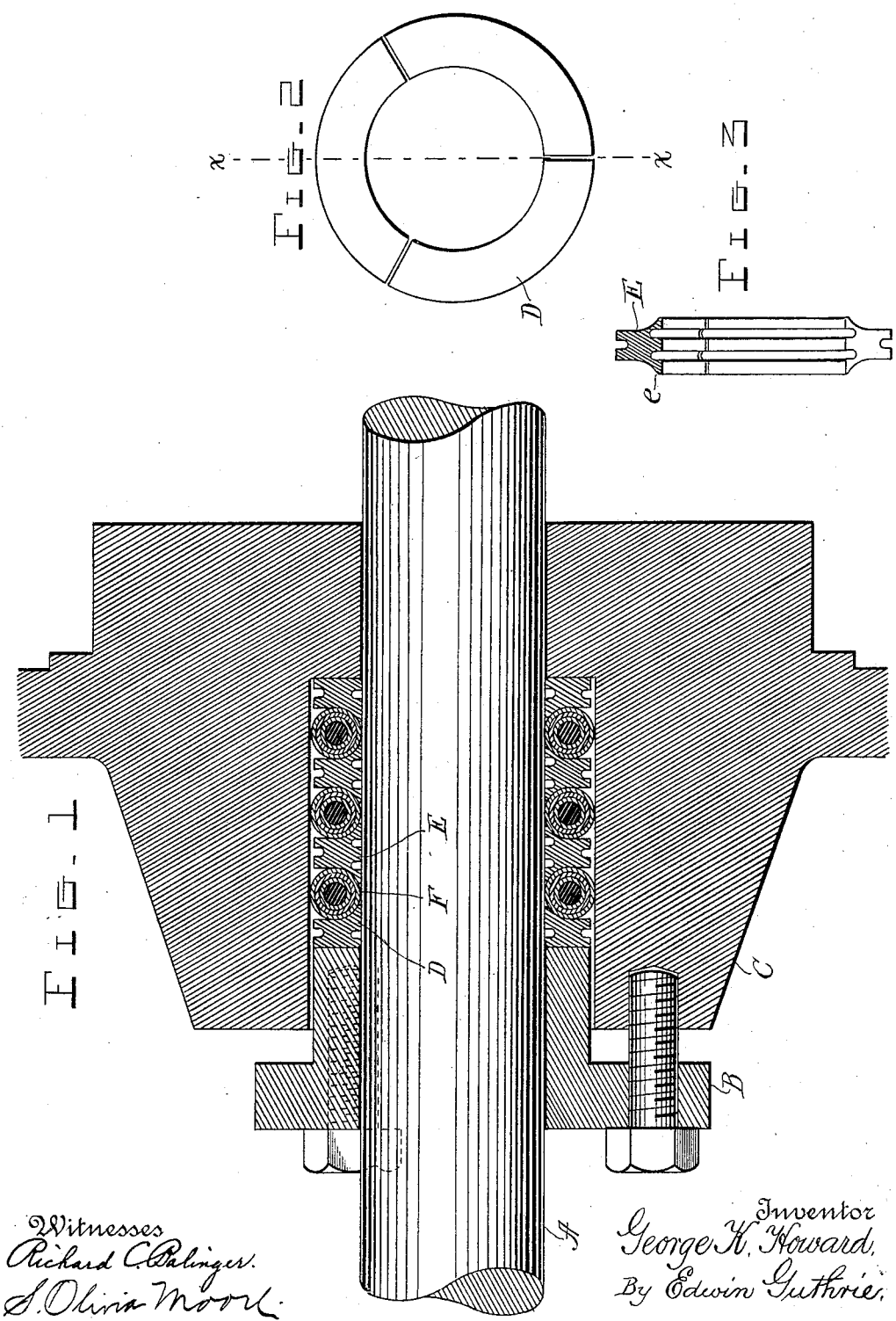

GEORGE K. HOWARD, OF RICHMOND HILL, NEW YORK.

ROD-PACKING.

No. 902,296.  Specification of Letters Patent.  Patented Oct. 27, 1908.

Application filed December 21, 1907. Serial No. 407,539.

To all whom it may concern:

Be it known that I, GEORGE K. HOWARD, citizen of the United States, residing at Richmond Hill, in the county of Queens and State of New York, have invented certain new and useful Improvements in Rod-Packing, of which the following is a specification.

My invention relates to rod packing, and has for its object the production of devices for making steam tight joints with movable piston rods or pump rods or the like, and having special construction and particular arrangement of parts by which it is believed the packing is more effective and causes less friction than in other such devices with which I am familiar.

My invention belongs with those that employ both metallic rings, usually divided rings, and fabric rings.

The peculiar construction and disposition of parts making up my invention are set forth in the accompanying drawings, of which Figure 1 is a vertical section lengthwise of the stuffing box, that is to say lengthwise of the rod. Fig. 2 is a front view of one of the divided metal rings. Fig. 3 represents a section of one of the intermediate metal rings on a line having the position of line $x$—$x$ in Fig. 2.

Like reference letters are used to designate the same parts throughout the specification and drawings.

The letter A marks the rod, B a movable gland, and C the stuffing box through which the rod passes.

Within the box are arranged the end metal packing rings D and the similar intermediate packing rings E also of metal, and all having suitable oil grooves. Between the metal rings are placed the fabric or composition packing rings F of circular cross-section and having elasticity. It will be noted that the packing rings F touch the interior of the stuffing box and equally bear against the rod. The extended edges $e$ of the metal rings do not come together, and the packing F is in contact with the rod between the extensions of the metal rings. The metal rings do not touch the interior of the stuffing box. Now, it will be observed, that the surfaces of the metal rings between which the packing F is situated are flat and are perpendicular to the interior of the box. When, therefore, the gland B is forced inwardly the rings of packing F are compressed into contact with the stuffing box and equally against the rod, at the same time the metal rings D and E are pressed inwardly to the rod. The metal rings are customarily divided at two or more points as shown in Fig. 2.

It is believed to have been now shown and described that the metal packing is adequately held against the rod, and the compressible packing equally pressed into contact with the box as well as with the rod, and, by reason of the arrangement and the position of the extensions $e$ of the metal rings, the tendency of any portion of the elastic packing to wedge is entirely eliminated, avoiding a considerable amount of friction and correspondingly adding to the useful life of the packing.

Having now described my invention and explained the mode of its operation, what I claim is—

1. A rod packing comprising sectional metallic rings encircling the rod and in contact with the rod, the said metallic rings having portions extending towards each other and against the rod, a space being left between the said extended portions of the rings and exposing the rod, a stuffing box, and rings of compressible packing placed between the said metallic rings, the said packing rings adapted to be compressed between the metallic rings and against both the stuffing box and the rod, the said metallic rings being held out of contact with the stuffing box and forced against the rod, substantially as described.

2. A rod packing comprising sectional metallic rings encircling the rod and in contact with the rod, the said metallic rings having curved portions extending towards each other and against the rod, a space being left between the said extended portions of the rings and exposing the rod, a stuffing box, and rings of compressible cylindrical packing placed between the said metallic rings, the said packing rings adapted to be compressed between the metallic rings and against both the stuffing box and the rod, the said metallic rings being held out of contact with the stuffing box and forced against the rod, substantially as described.

In testimony whereof I affix my signature in presence of two witnesses.

GEORGE K. HOWARD.

Witnesses:
C. H. McKINNEY,
WM. A. HERTLE.